United States Patent
Suzuki et al.

(10) Patent No.: US 11,287,864 B2
(45) Date of Patent: Mar. 29, 2022

(54) POWER SUPPLY CIRCUIT WITH SWITCH FOR CONNECTION OF A DC POWER SUPPLY TO A POWER SUPPLY UNIT BASED ON SENSED TEMPERATURE

(71) Applicant: CASIO COMPUTER CO., LTD., Tokyo (JP)

(72) Inventors: Hideo Suzuki, Ome (JP); Masanori Ishihara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 173 days.

(21) Appl. No.: 16/830,433

(22) Filed: Mar. 26, 2020

(65) Prior Publication Data

US 2020/0310505 A1    Oct. 1, 2020

(30) Foreign Application Priority Data

Apr. 1, 2019   (JP) .............................. JP2019-069594

(51) Int. Cl.
*G06F 1/26*    (2006.01)
*G05F 1/46*    (2006.01)
(Continued)

(52) U.S. Cl.
CPC .................. *G06F 1/26* (2013.01); *G05F 1/46* (2013.01); *G01K 13/00* (2013.01); *G06F 1/206* (2013.01); *G06F 1/263* (2013.01); *G06F 9/5094* (2013.01)

(58) Field of Classification Search
CPC ... G06F 1/26; G06F 1/263; G06F 1/46; G06F 1/206; G06F 9/5094; G01K 13/00
(Continued)

(56) References Cited

U.S. PATENT DOCUMENTS

| 5,590,061 A | * | 12/1996 | Hollowell, II | .......... G06F 1/206 702/130 |
| 2006/0143488 A1 | * | 6/2006 | Peleg | ..................... H04L 12/10 713/330 |

(Continued)

FOREIGN PATENT DOCUMENTS

| JP | S63012013 A | 1/1988 |
| JP | H09325834 A | 12/1997 |

(Continued)

*Primary Examiner* — Ji H Bae

(74) *Attorney, Agent, or Firm* — Holtz, Holtz & Volek PC

(57) ABSTRACT

It becomes possible to succeed in restarting a power supply unit.

A power supply circuit includes the power supply unit which supplies DC power to a CPU, a switch which operates to cause a short-circuit to occur between a DC power supply and an input terminal of the power supply unit or to open a connection between the DC power supply and the input terminal of the power supply unit, a temperature measurement unit which measures a temperature and a processor which controls the switch to open the connection in a case of deciding that the DC power is not supplied to the CPU even when controlling the switch to cause the short-circuit to occur and controls the switch to cause the short-circuit to occur after a predetermined time elapses after controlling the switch to open the connection. The predetermined time is set on the basis of the temperature that the temperature measurement unit measures.

15 Claims, 5 Drawing Sheets

(51) Int. Cl.
*G01K 13/00* (2021.01)
*G06F 1/20* (2006.01)
*G06F 9/50* (2006.01)

(58) Field of Classification Search
USPC .................................................. 713/300, 330
See application file for complete search history.

(56) References Cited

U.S. PATENT DOCUMENTS

| | | | | |
|---|---|---|---|---|
| 2008/0028244 | A1* | 1/2008 | Capps | G06F 1/206 |
| | | | | 713/324 |
| 2013/0235689 | A1* | 9/2013 | Koyama | H01L 27/1203 |
| | | | | 365/227 |
| 2014/0359327 | A1* | 12/2014 | Matsushima | G06F 1/263 |
| | | | | 713/320 |
| 2016/0246346 | A1* | 8/2016 | Sugumar | G06F 1/206 |
| 2017/0257079 | A1* | 9/2017 | Jain | G06F 1/3206 |

FOREIGN PATENT DOCUMENTS

| | | | |
|---|---|---|---|
| JP | 2004185439 A | 7/2004 |
| JP | 2007264257 A | 10/2007 |
| JP | 2008293181 A | 12/2008 |
| JP | 2016187288 A | 10/2016 |

* cited by examiner

POWER SUPPLY CIRCUIT WITH SWITCH FOR CONNECTION OF A DC POWER SUPPLY TO A POWER SUPPLY UNIT BASED ON SENSED TEMPERATURE

CROSS REFERENCE TO RELATED APPLICATIONS

This application is based upon and claims the benefit of priority under 35 USC 119 of Japanese Patent Application No. 2019-069594 filed on Apr. 1, 2019 the entire disclosure of which, including the description, claims, drawings, and abstract, is incorporated herein by reference in its entirety.

BACKGROUND

1. Field

The present technical field relates to a power supply circuit (in a power supply system), a power supply controlling method and a storage medium.

2. Related Art

An electronic device startup method for preventing low temperature-induced non-startup of the device is disclosed in Japanese Patent Application Laid Open No. 2004-185439 filed in Japan.

SUMMARY

According to one embodiment of the present invention, there is provided a power supply circuit which includes a power supply unit which supplies DC power to a load, a switch which operates to cause a short-circuit to occur between a DC power supply and an input terminal of the power supply unit or to open a connection between the DC power supply and the input terminal of the power supply unit, a sensor unit which measures a temperature and a processor which controls the switch to open the connection in a case of deciding that the DC power is not supplied to the load even when controlling the switch to cause the short-circuit to occur and controls the switch to cause the short-circuit to occur after a predetermined time elapses after controlling the switch to open the connection, in which the predetermined time is set on the basis of the temperature that the sensor unit measures.

DETAILED DESCRIPTION

In the following, embodiments of the present invention will be described in detail with reference to the drawings. Incidentally, the respective drawings just schematically illustrate the embodiments to such an extent that sufficient understanding of the embodiments is possible. In addition, in the respective drawings, the same numerals are assigned to common constitutional elements and similar constitutional elements and redundant explanation thereof is omitted.

First Embodiment

Figure 1:
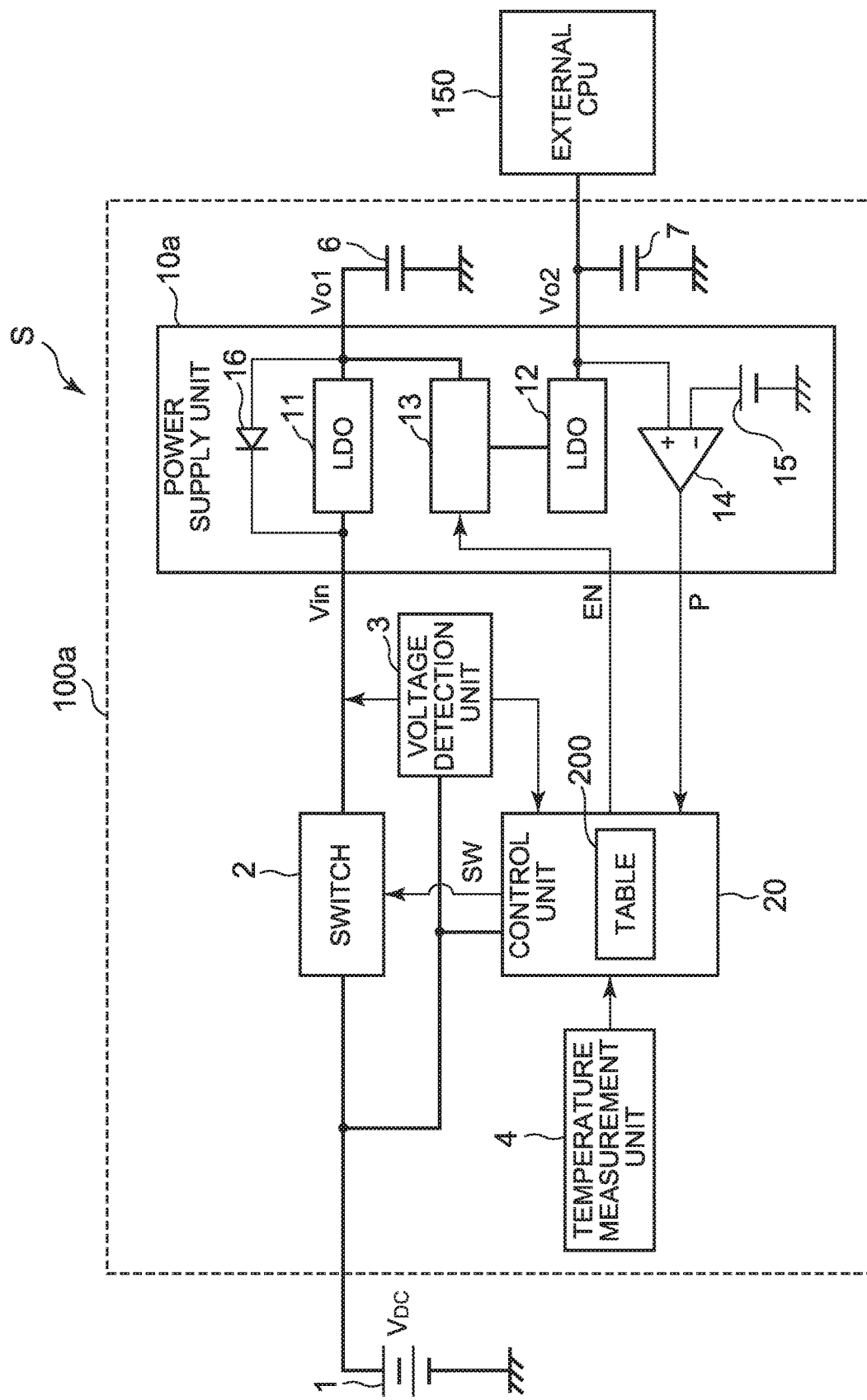
FIG. 1 is a configuration diagram illustrating one example of a power supply system which includes a power supply circuit according to a first embodiment of the present invention.

FIG. 1 is a configuration diagram illustrating one example of a power supply system which includes a power supply circuit according to a first embodiment of the present invention.

A power supply system S includes a DC power supply 1, a power supply circuit 100a and an external CPU (Central Processing Unit) 150 which is attached as an external circuit and is loaded on portable equipment such as, for example, a smartwatch and so forth. Incidentally, in the first embodiment, the external CPU 150 of the smartwatch controls, for example, a liquid crystal display panel and so forth which are not illustrated in FIG. 1. Accordingly, the liquid crystal display panel and so forth which are to be controlled by the CPU 150 are included as external circuits. The external circuits are not limited to the liquid crystal display panel and so forth and may be changed depending on a device to which the external circuits are attached. The DC power supply 1 is a power supply which generates a DC voltage such as, for example, a primary battery, a secondary battery and so forth and generates a DC voltage VDC. The power supply circuit 100a steps down the DC voltage VDC that the DC power supply 1 supplies and supplies DC power to loads such as the external CPU 150, the liquid crystal display panel which is not illustrated. Incidentally, in the power supply circuit 100a which is illustrated in FIG. 1, a bold line indicates a current path and a thin line indicates a signal line and so forth.

The power supply circuit 100a includes a switch 2, a voltage detection unit 3, a temperature measurement unit 4 which serves as a sensor unit, a first capacitor 6, a second capacitor 7, a power supply unit 10a and a control unit 20. In the first embodiment, the switch 2 is a semiconductor switch, such as, for example, a MOS (Metal Oxide Semiconductor) switch, an SSR (Solid-State Relay) and so forth and is installed between the DC power supply 1 and an input terminal of the power supply unit 10a. The switch 2 is not limited to the semiconductor switch and may be changed to an another-type switch. The switch 2 is switched to an on state or to an off state in accordance with control of the control unit 20. That is, the state of the switch 2 is switched so as to enter a state (the on state) where the DC power supply 1 and the input terminal of the power supply unit 10a are short-circuited or to a state (the off state) where a connection between the DC power supply 1 and the input terminal of the power supply unit 10a is opened in accordance with the control of the control unit 20.

The switch 2 enters the on state and the DC power supply 1 and the input terminal of the power supply unit 10a are brought into a short-circuited state, and thereby the DC power which is supplied from the DC power supply 1 is supplied to the power supply unit 10a. In the first embodiment, the switch 2 is switched to the on state or the off state in accordance with an SW signal that the control unit 20 transmits to the switch 2. For example, in a case where the SW signal is at a low level, the switch 2 is switched to the off state and in a case where the SW signal is at a high level, the switch 2 is switched to the on state. Incidentally, although there is no particular limitation on magnitude of a capacitance of each capacitor and a magnitude relation between the capacitances of the first capacitor 6 and the second capacitor 7, in the first embodiment, a case where the capacitance of the second capacitor 7 is set smaller than the capacitance of the first capacitor 6 will be described by way of example. In addition, although not illustrated in particular, the power supply unit 10a may further include additional output terminals and there is no particular limitation on the magnitude of the capacitance of each capacitor to be connected to each output terminal.

The voltage detection unit 3 detects whether an input voltage Vin into the power supply unit 10a is more than a predetermined threshold value and notifies the control unit 20 of a result of detection. Incidentally, in the first embodiment, the input voltage Vin becomes almost equal to the DC voltage VDC that the DC power supply 1 supplies to the power supply circuit 100a. In the first embodiment, the temperature measurement unit 4 measures a temperature concerned and outputs a voltage which depends on the measured temperature. Then, the control unit 20 specifies the temperature on the basis of a value of the output voltage from the temperature measurement unit 4. Although it is preferable for the temperature measurement unit 4 to measure, for example, a temperature of the first capacitor 6, the temperature measurement unit 4 may measure a temperature in the device (the power supply circuit 100a) that the first capacitor 6 is loaded and an environmental temperature. The voltage detection unit 3 and the temperature measurement unit 4 are driven using the output voltage from the DC power supply 1. The first capacitor 6 and the second capacitor 7 are capacitors which are externally attached to an IC (Integrated Circuit) of the power supply unit 10a. In general, temperature dependency is observed in a discharge time of a capacitor and a way of falling the voltage of the capacitor when discharged. Accordingly, the first capacitor 6 exhibits the temperature dependency in the discharge time and the way of falling the voltage when discharged.

The power supply unit 10a includes an LDO (Low Drop Out) power supply 11 which functions as a first step-down section, an LDO power supply 12 which functions as a second step-down section, a logic circuit section 13, a comparator 14 which functions as a decision circuit section, a reference power supply 15 and a diode 16. The LDO power supply 11 is a DC power supply circuit section which steps the input voltage Vin down to a first output voltage Vo1 and the first capacitor 6 is connected to an output terminal of the LDO power supply 11. Thereby, when the switch 2 is switched to the on state, the LDO power supply 11 outputs the first output voltage Vo1.

The logic circuit section 13 is equipped with a built-in drive circuit part and applies the first output voltage Vo1 from the LDO power supply 11 to an input terminal of the LDO power supply 12 on the basis of an EN signal that the control unit 20 outputs. For example, in the first embodiment, when the EN signal that the control unit 20 outputs is set to the high level, the logic circuit section 13 applies the first output voltage Vo1 from the LDO power supply 11 to the input terminal of the LDO power supply 12. In a case where the EN signal is set to the high level in a state where the first capacitor 6 is not yet completely discharged, it sometimes occurs that the logic circuit section 13 does not normally operate.

The LDO power supply 12 is a step-down circuit section which steps a DC voltage (≈ the first output voltage Vo1) which is applied via the logic circuit section 13 down to a second output voltage Vo2. The second capacitor 7 is connected to an output terminal of the LDO power supply 12 and the external CPU 150 and so forth are connected to the capacitor 7 as the external circuits. An anode of the diode 16 is connected to the output terminal of the LDO power supply 11 and a cathode of the diode 16 is connected to an input terminal of the LDO power supply 11. Thereby, in a case where the switch 2 is switched to the off state, the diode 16 protects the LDO power supply 11 and sends the first output voltage Vo1 back to the input terminal.

The comparator 14 compares the second output voltage Vo2 from the LDO power supply 12 with a voltage (a reference voltage) of the reference power supply 15 and transmits a result of comparison (a result of decision) to the control unit 20 as a feedback signal P. The reference power supply 15 is an element which maintains a steady voltage independently of a current, for example, a Zener diode. The reference voltage is set lower than an output setting voltage of the LDO power supply 12. The comparator 14 decides whether the LDO power supply 12 outputs the second output voltage Vo2 on the basis of the reference voltage. In other words, the comparator 14 compares the second output voltage Vo2 from the LDO power supply 12 with the voltage (the reference voltage) of the reference power supply 15, and in a case where the second output voltage Vo2 is higher than the voltage (the reference voltage) of the reference power supply 15, transmits the feedback signal P at the high level to the control unit 20, and in a case where the voltage (the reference voltage) of the reference power supply 15 is higher than the second output voltage Vo2, transmits the feedback signal P at the low level to the control unit 20. Thereby, the comparator 14 functions as the decision circuit section which decides whether the LDO power supply 12 is in a startup state and transmits the result of decision to the control unit 20 as the feedback signal P. Incidentally, the feedback signal P means a feedback signal which is transmitted to the control unit 20 in response to the EN signal.

The control unit 20 includes a not illustrated CPU (Central Processing Unit) and a not illustrated storage section. In the first embodiment, for example, a FROM (Flash Read Only Memory) and a RAM (Random Access Memory) are included in the storage section. A power supply control program and a table 200 which are used to make the control unit 20 execute a power supply controlling method according to one embodiment of the present invention are stored in the FROM. In a case where the second output voltage Vo2 of the LDO power supply 12 is not generated by execution of the power supply control program, the control unit 20 brings the power supply unit 10a into a standby state via the switch 2 (hereinafter, referred to as "maintains the standby state") for a predetermined time and then restarts the power supply unit 10a. That is, the control unit 20 maintains the standby state until it is decided that the second output voltage Vo2 is not generated from the LDO power supply 12 by the comparator 14 by execution of the power supply control program and the predetermined time elapses after receiving the feedback signal P from the comparator 14 and then restarts the power supply unit 10a. The table 200 indicates a relation between each temperature that the temperature measurement unit 4 measures and each startup standby time which is a standby time to be taken when starting up the power supply unit 10a.

Incidentally, the startup standby time is a standby time which is counted after the control unit 20 shifts the switch 2 to the off state. However, the startup standby time which is stored in the form of the table 200 may be either a standby time which is counted after it is decided by the comparator 14 that the second output voltage Vo2 is not generated from the LDO power supply 12 and the feedback signal P is received from the comparator 14 or a standby time which is counted after the control unit 20 shifts the switch 2 to the off state. The startup standby time is set to a time for which electric charges which are accumulated in the first capacitor 6 are sufficiently discharged by taking a discharge time of the first capacitor 6 which exhibits the temperature dependency into consideration. Incidentally, since the electric charge discharge time is changed also depending on the voltage that the LDO power supply 11 outputs, the startup standby time may be changed depending on the magnitude of an output setting voltage of the LDO power supply 11. In this case, the storage section which is not illustrated may store the startup standby time, the temperature and the output setting voltage of the LDO power supply 11 in correspondence with one another.

Figure 2:
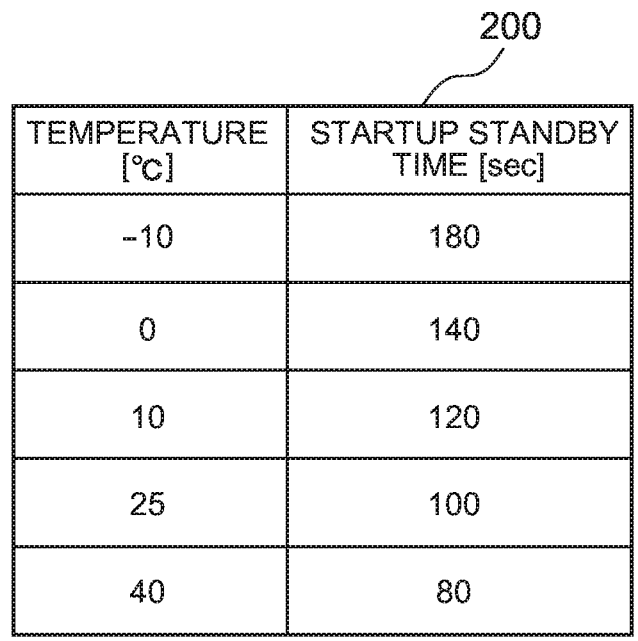
FIG. 2 is a table indicating one example of a relation between each temperature and each startup standby time.

FIG. 2 is a table illustrating one example of a relation between each temperature and each startup standby time.

The table 200 has Temperature and Startup Standby Time as items and stores, for example, the startup standby times 180 (sec.), 140 (sec.), 120 (sec.), 100 (sec.) and 80 (sec.) in one-to-one correspondence with the temperatures −10 [° C.], 0 [° C.], 10 [° C.], 25 [° C.] and 40 [° C.] respectively. Incidentally, the control unit 20 lineally interpolates an intermediate value between respective temperatures concerned. Also, incidentally, a temperature range within which the standby times are more finely set in accordance with the characteristic of the first capacitor 6 may be prepared.

Figure 3:
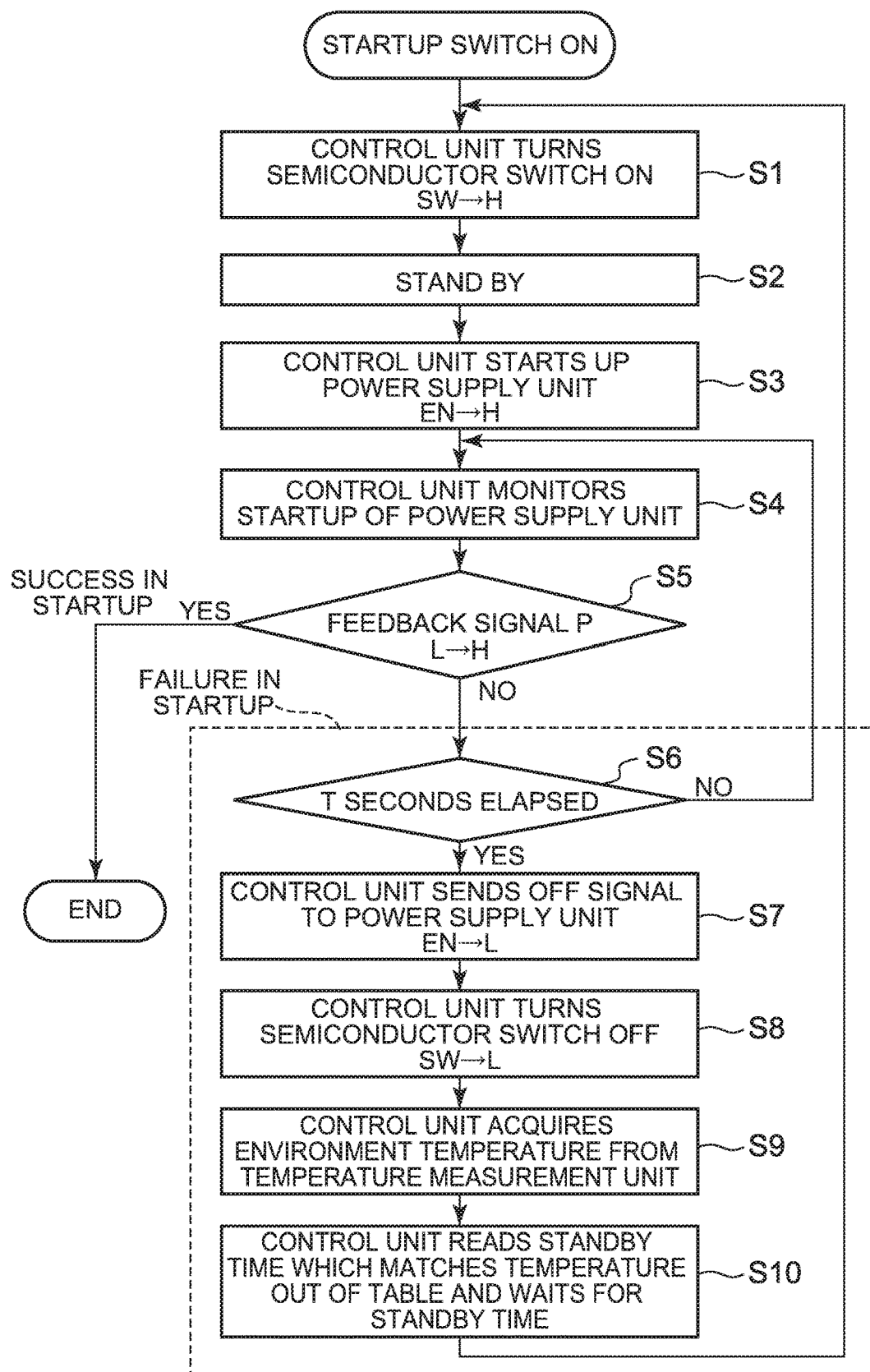
FIG. 3 is a flowchart illustrating one example of an operation of the power supply circuit according to the first embodiment of the present invention.
Figure 4:
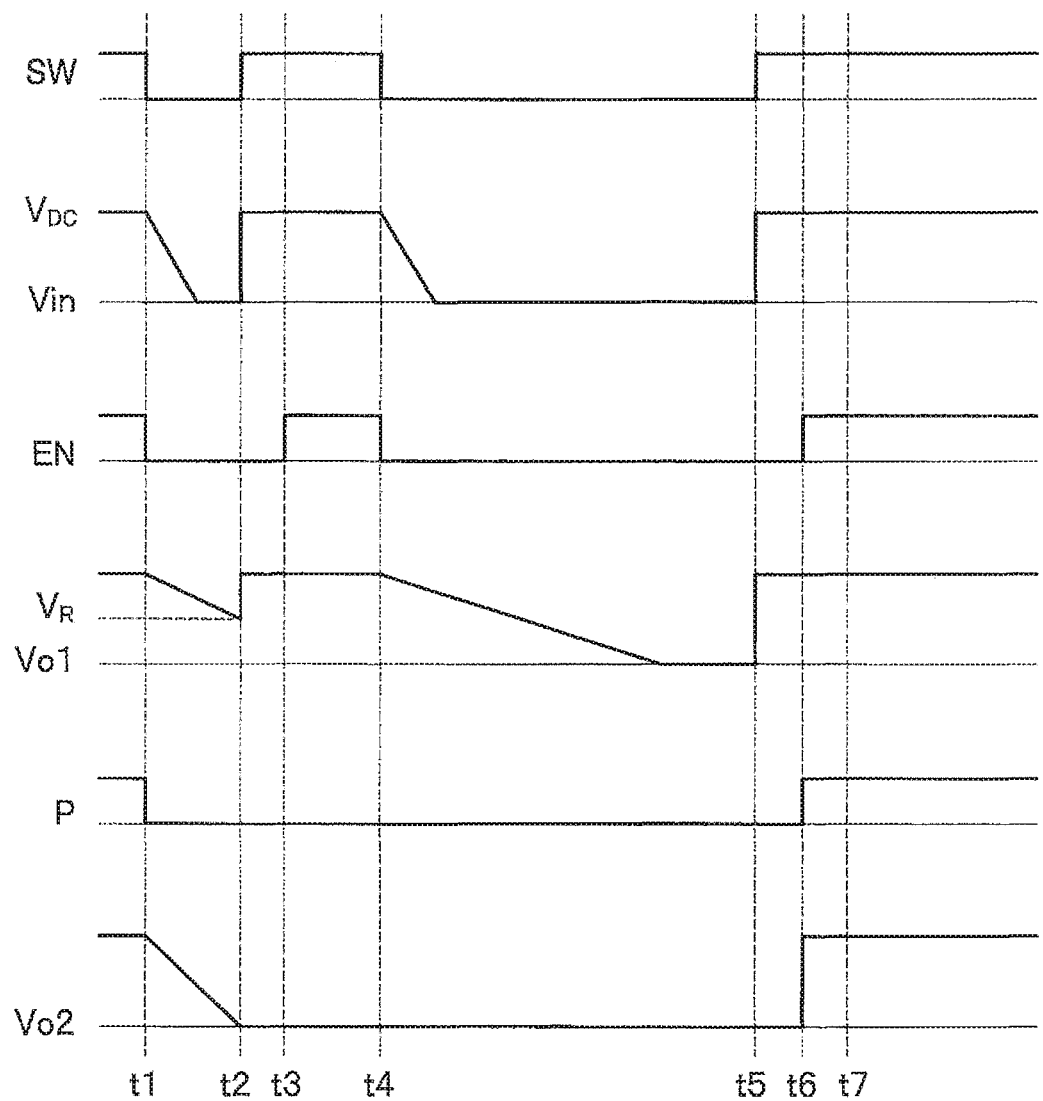
FIG. 4 is a timing chart illustrating one example of the operation of the power supply circuit according to the first embodiment of the present invention.

FIG. 3 is a flowchart illustrating one example of a method that the control unit 20 adopts for execution of power supply control processing of the power supply circuit 100a according to the first embodiment, that is, the power supply controlling method according to one embodiment of the present invention. FIG. 4 is a timing chart of the power supply controlling method in FIG. 3.

An operator operates an operation unit (not illustrated) at a time t2 in FIG. 4 and thereby the CPU in the control unit 20 reads out and executes the power supply control program which is stored in the storage section in the control unit 20 in accordance with the flowchart in FIG. 3. First, operations which are executed until the time t2 comes will be described using FIG. 4 and then operations which are executed after the time t2 will be described using FIG. 3 and FIG. 4.

In a state of a time t< a time t1, the switch 2 is in the on state, the input voltage Vin which is almost equal to the DC voltage VDC is applied to the input terminal of the power supply unit 10a and the first output voltage Vo1 is applied to the first capacitor 6.

At the time t1, the control unit 20 shifts the SW signal from the high level to the low level so as to shift the switch 2 from the on state to the off state. Thereby, the first output voltage Vo1 from the first capacitor 6 gradually falls and the input voltage Vin into the power supply unit 10a gradually falls to a value which is obtained by subtracting a forward voltage of the diode 16 from the first output voltage Vo1.

At the time t1, the control unit 20 shifts the EN signal from the high level to the low level simultaneously with shifting of the SW signal to the low level. Thereby, the second output voltage Vo2 falls as the first output voltage Vo1 from the power supply unit 10a falls. Thereby, the feedback signal P that the comparator 14 outputs is changed from the high level to the low level.

At the time t2, the flow in FIG. 3 is started up by reading the power supply control program out of the storage section of the control unit 20 and executing the program. In this case, a time (t2-t1) is set short to such an extent that a residual voltage VR (for example, about 0.5V) is left in the first capacitor 6. Incidentally, in the first embodiment, since the second capacitor 7 is smaller than the first capacitor 6 in capacitance, the second output voltage Vo2 is larger than the first output voltage Vo1 in rate of electric charge reduction caused by discharging. Accordingly, the second output voltage Vo2 falls to 0V.

The control unit 20 shifts the SW signal from the low level to the high level so as to shift the switch 2 to the on state (S1). Thereby, the input voltage Vin into the power supply unit 10a rises to the DC voltage VDC and the first output voltage Vo1 rises. Incidentally, at the time t2, the control unit 20 does not shift the EN signal to the high level.

After execution of the process in S1, the control unit 20 maintains the standby state for a predetermined time (t3-t2) (S2). Owing to this standby, the second output voltage Vo2 falls to 0V at a time t3 even in a case where the second output voltage Vo2 does not fall to 0V at the time t2. After standby in S2, the control unit 20 shifts the EN signal to the high level so as to start up the LDO power supply 12 of the power supply unit 10a (S3). In this case, the operation of the logic circuit 13 becomes unstable under the influence of the residual voltage VR in the first capacitor 6 and therefore the LDO power supply 12 is not driven. Accordingly, at the time t3, the second output voltage Vo2 is maintained in a 0V state and the feedback signal P is maintained at the low level. Incidentally, the residual voltage VR takes various values depending on operations and power consumption of the external CPU 150 and so forth.

After execution of the process in S3, the control unit 20 monitors startup of the power supply unit 10a (the LDO power supply 12 in particular) (S4) and decides the state of the feedback signal P (S5). In a case where the feedback signal P is shifted from the low level to the high level (Yes in S5), the control unit 20 decides that the power supply unit 10a is normally started up and terminates execution of processes.

On the other hand, in a case where the feedback signal P is maintained at the low level (No in S5), the control unit 20 judges that startup of the power supply unit 10a ends in failure and decides whether T seconds (for example, 2 seconds) have elapsed (S6). In a case where the T seconds do not elapse (No in S6), the control unit 20 returns to the process in S4 and continues monitoring of the feedback signal P. After the T seconds have elapsed (yes in S6), the control unit 20 shifts the EN signal from the high level to the low level at a time t4 (S7). In other words, the control unit 20 sends a signal for turning output from the power supply unit 10a off to the power supply unit 10a. Since the LDO power supply 12 of the power supply unit 10a is not driven, the second output voltage Vo2 is maintained at 0V.

After execution of the process in S7, the control unit 20 shifts the SW signal from the high level to the low level at the time t4 so as to shift the switch 2 to the off state (S8). Thereby, the first output voltage Vo1 from the power supply unit 10a gradually falls. Incidentally, since the LDO power supply 12 is not driven, the second output voltage Vo2 is maintained at 0 volt. Incidentally, the input voltage Vin into the power supply unit 10a falls to the value which is obtained by subtracting the forward voltage of the diode 16 from the first output voltage Vo1.

After execution of the process in S8, the control unit 20 acquires a temperature from the temperature measurement unit 4 (S9), reads in the startup standby time which matches the temperature with reference to the table 200 (FIG. 2) and maintains the standby state for the read-in startup standby time (S10). In this case, the control unit 20 linearly interpolates an intermediate value between respective temperatures concerned in the table 200 and arithmetically calculates an intermediate value between respective startup standby times concerned. Incidentally, each startup standby time is set to a time for which the electric charges which are accumulated in the first capacitor 6 are sufficiently discharged by taking the discharge time of the first capacitor 6 which exhibits the temperature dependency into consideration. Owing to this standby, the electric charges in the first capacitor 6 are sufficiently discharged and the first output voltage Vo1 falls to 0V. After execution of the process in S10, the control unit 20 returns to the process in S1, shifts the SW signal to the high level at a time t5 and restarts the power supply unit 10a.

Owing to restart (S1) of the power supply unit 10a, the input voltage Vin into the power supply unit 10a rises to the DC voltage VDC and also the first output voltage Vo1 rises at the time t5. The control unit 20 maintains the standby state for a predetermined time (t6-t5) in S2 and then shifts the EN signal to the high level at the time t6 (S3). In the restart of the power supply unit 10a, since the electric charges in the first capacitor 6 are sufficiently discharged, the logic circuit section 13 normally operates and drives the LDO power supply 12. Then, the second output voltage Vo2 which is necessary for driving is generated and the external CPU 150 is driven. Then, the feedback signal P rises to the high level. That is, the feedback signal P shifts to the high level at the time t6. Thereby, the feedback signal P enters a state of more accurately informing the control unit 20 of normal startup of the power supply unit 10a.

As described above, in the power supply system S which includes the power supply circuit 100a according to the first embodiment of the present invention, in a case where the logic circuit section 13 malfunctions due to the residual electric charges in the first capacitor 6 and therefore the LDO power current 12 is not driven even when the EN signal of the power supply unit 10a is risen, the control unit 20 once shifts the switch 2 to the off state and maintains the standby state for the predetermined time. Then, the control unit 20 shifts the switch 2 to the on state and rises the EN signal in a state where the residual electric charges in the first capacitor 6 are eliminated. Thereby, the malfunction of the logic circuit section 13 is avoided and the LDO power supply 12 is driven.

Incidentally, the lower the environmental temperature (the temperature of the first capacitor 6 in particular) becomes, the longer the predetermined time for standby is set.

In the power supply system S which includes the power supply circuit 100a according to the first embodiment of the present invention, it becomes possible to surely promote the progress of the sequence by detecting that sequential control does not normally operate, returning to the state obtained before the sequence concerned is started, setting a standby time which is sufficient for eliminating the cause of no normal operation of the sequence control and then executing again the sequence concerned.

The electronic device startup method for preventing low temperature-induced non-startup of the device is disclosed in Japanese Patent Application Laid Open No. 2004-185439 filed in Japan. That is, the technique which is described in Japanese Patent Application Laid Open No. 2004-185439 is configured such that in a case where the temperature in the space is less than the first temperature when the electronic device is started up, the control means maintains the standby state without reading the program out of the storage means so as not to perform intake and exhaust using the fan and so forth. Then, the technique which is described in Japanese Patent Application Laid Open No. 2004-185439 is configured such that in a case where the temperature in the space exceeds the first temperature owing to heat generation from the element, the control means reads the program out of the storage means so as to start up the device.

However, the technique which is described in Japanese Patent Application Laid Open No. 2004-185439 is the technology which is established on the assumption that the temperature is lowered by performing the intake and exhaust using the fan and so forth. As another cause of a failure in startup of the device, a point that, for example, in a case where the device is restarted without leaving a time after the failure in startup of the device due to a reduction in capacitance of the capacitor, the electric charges are not completely discharged from the capacitor and restart ends in failure in some cases is given. In addition, in a case where it takes much time until the temperature of the element reaches the first temperature, it follows that a user is forced to wait for a longer time than is necessary.

On the other hand, according to the first embodiment of the present invention, it becomes possible to surely succeed in restarting the power supply unit. In addition, since the standby time which is sufficient for eliminating the cause of non-normal operation of the device is set depending on the temperature, it becomes possible to succeed in restarting the power supply unit without waiting until the temperature is changed.

Second Embodiment

Although in the first embodiment, the result of decision which is obtained by deciding the state of generation of the second output voltage Vo2 using the comparator 14 is transmitted to the control unit 20 as the feedback signal P, the output state of the external CPU 150 may be also transmitted to the control unit 20.

Figure 5:
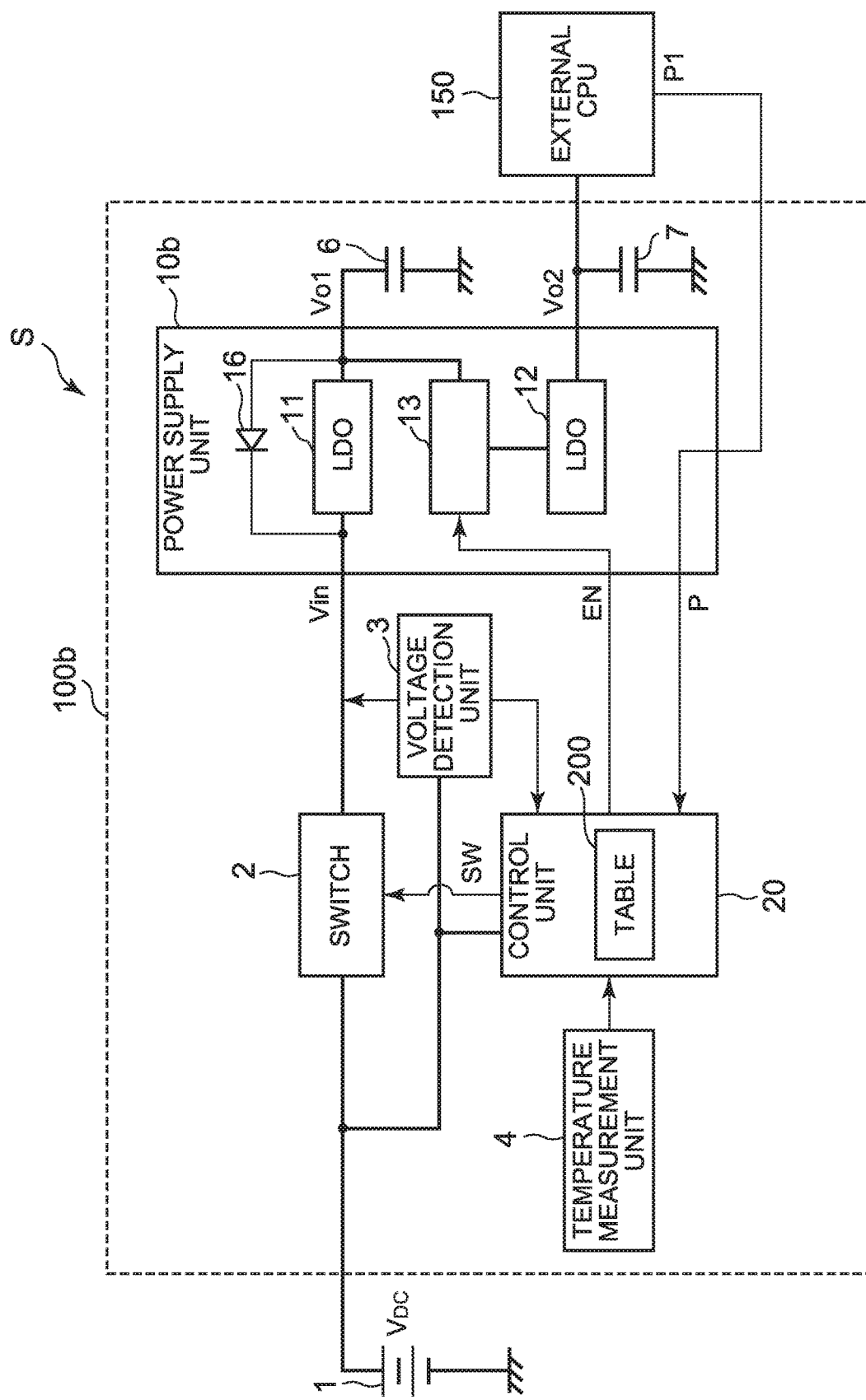
FIG. 5 is a configuration diagram illustrating one example of a power supply system which includes a power supply circuit according to a second embodiment of the present invention.

FIG. 5 is a configuration diagram illustrating one example of a power supply system which includes a power supply circuit according to a second embodiment of the present invention.

The power supply system S includes the DC power supply 1, a power supply circuit 100b and the external CPU 150 which is attached as the external circuit similarly to the first embodiment. The power supply circuit 100b includes the switch 2, the voltage detection unit 3, the temperature measurement unit 4, the first capacitor 6, the second capacitor 7, a power supply unit 10b and the control unit 20. Although the power supply unit 10b includes the two LDO power supplies 11 and 12, the logic circuit section 13 and the diode 16, the power supply unit 10b does not include the comparator 14 and the reference power supply 15 which are illustrated in FIG. 1. Incidentally, there is no particular limitation on the magnitude of the capacitances of the first capacitor 6 and the second capacitor 7 and there is no particular limitation also on the magnitude relation between the capacitances of the first capacitor 6 and the second capacitor 7. In addition, although not illustrated in FIG. 5 in particular, the power supply unit 10b may further have output terminals other than those in FIG. 5 and there is no particular limitation also on the magnitude of the capacitance of each capacitor which is connected to each output terminal. The second embodiment is one example of a case where the capacitance of the second capacitor 7 is smaller than the capacitance of the first capacitor 6.

An output signal P1 to be output from the external CPU 150 is used as the feedback signal P of the power supply unit 10b. The output signal P1 is set to the high level in a state where the external CPU 150 is driven. That is, in a case where the second output voltage Vo2 is not generated and the external CPU 150 is not driven, the output signal P1 shifts to the low level. Then, the power supply unit 10b transmits the output signal P1 to the control unit 20 as the feedback signal P. Thereby, it becomes possible for the control unit 20 to decide that the second output voltage Vo2 is not generated and the external CPU 150 is not driven and thereby to restart the power supply unit 10b. Incidentally, since a certain time is necessary for decision, there are cases where the feedback signal P (the time t6 (FIG. 4)) rises slightly later than the time t6.

As described above, in the power supply system S which includes the power supply circuit 100b according to the second embodiment of the present invention, the control unit 20 recognizes that the logic circuit section 13 malfunctions due to the residual electric charges (the residual voltage VR (FIG. 4)) in the first capacitor 6 and the LDO power supply 12 is not driven even when rising the EN signal of the power supply unit 10b by acquiring the output signal P1 from the external CPU 150 as the feedback signal P via the power supply unit 10b.

Then, the control unit 20 once shifts the switch 2 to the off state and maintains the standby state for the predetermined startup standby time in the same manner as in the first embodiment. Then, the control unit 20 shifts the switch 2 to the on state and rises the EN signal in a state where no residual electric charge is left in the first capacitor 6. Thereby, the malfunction of the logic circuit section 13 is avoided and the LDO power supply 12 is driven. Incidentally, the predetermined startup standby time may be counted either after the switch 2 is shifted to the off state or after the control unit 20 acquires the feedback signal P.

Modified Example

The present invention is not limited to the first and second embodiments and may be modified, for example, as follows.

(1) Although in each of the first and second embodiments, the power supply unit 10a (10b) includes the LDO power supply 11, the LDO power supply 11 may be omitted. That is, the output terminal of the switch 2 may be connected to the first capacitor 6. In this case, the voltage detection unit 3 measures the input voltage Vin=the first output voltage Vo1. In addition, the startup standby time in the table 200 is set to a longer time value as the voltage of the DC power supply 1 becomes higher.

(2) Although in the first and second embodiments, the control unit 20 maintains the standby state in S2 (FIG. 3), the control unit 20 may not maintain the standby state. In this case, the control unit 20 simultaneously shifts the SW signal and the EN signal to the high levels.

(3) The voltage detection unit 3 may directly detect the residual voltage VR in the first capacitor 6. In this case, since the control unit 20 may maintain the standby state until the residual voltage VR that the voltage detection unit 3 detects becomes less than a predetermined value, the startup standby time may not be set in advance.

(4) Although in the first and second embodiments, the startup standby time is set for sufficient discharge of the electric charges in the first capacitor 6, a startup standby time which is necessary for the residual voltage VR in the capacitor 6 to become less than a fixed value other than 0 may be set. For example, in a case where the residual voltage VR at which a failure occurs in startup is specified, such a configuration that the standby state is maintained until the residual voltage VR is lowered to such an extent that no failure occurs in startup may be made.

(5) Although in each of the first and second embodiments, the switch 2 is the semiconductor switch such as, for example, the MOS (Metal Oxide Semiconductor) switch, the SSR (Solid State Relay) and so forth, a mechanical relay may be used.

What is claimed is:

1. A power supply circuit comprising:
a power supply unit which supplies DC power to a load;
a switch which operates to cause a short-circuit to occur between a DC power supply and an input terminal of the power supply unit or to open a connection between the DC power supply and the input terminal of the power supply unit;
a sensor unit which measures a temperature; and
a processor which controls the switch to open the connection in a case in which it is decided that the DC power is not supplied to the load even when controlling the switch to cause the short-circuit to occur, and controls the switch to cause the short-circuit to occur after a predetermined time elapses after controlling the switch to open the connection, wherein
the predetermined time is set based on the temperature measured by the sensor unit.

2. The power supply circuit according to claim 1, further comprising:
a capacitor which holds an output voltage from the power supply unit.

3. The power supply circuit according to claim 1, wherein the predetermined time is set to a longer time value as the temperature measured by the sensor unit exhibits a lower value.

4. The power supply circuit according to claim 1, wherein the processor is driven with the DC power, the DC power being supplied by the DC power supply.

5. The power supply circuit according to claim 2, wherein:
the power supply unit includes a first step-down section which steps down an input voltage, a second step-down section which steps down an output voltage from the first step-down section, and a logic circuit section which controls power supply from the first step-down section to the second step-down section,
the load is connected to an output terminal of the second step-down section,
the capacitor includes a first capacitor which is connected to an output terminal of the first step-down section and a second capacitor which is connected to the output terminal of the second step-down section, and
the processor controls the logic circuit section depending on whether the switch operates to cause the short-circuit to occur or to open the connection.

6. The power supply circuit according to claim 5, wherein the predetermined time is set to a longer time value as the output voltage from the first step-down section becomes higher.

7. The power supply circuit according to claim 5, wherein:
the power supply unit further includes a decision circuit section which makes a decision as to whether the second step-down section is in a startup state after the switch operates to cause the short-circuit to occur and transmits a result of the decision to the processor, and the processor:
controls the switch to open the connection in a case where the result of the decision received from the decision circuit section indicates that the second step-down section is in a non-startup state, and controls the switch to cause the short-circuit to occur after the predetermined time period elapses after controlling the switch to open the connection, and
controls the switch to maintain the short-circuit in a case in which the result of the decision received from the decision circuit section indicates that the second step-down section is in the startup state.

8. The power supply circuit according to claim 7, wherein the decision circuit section comprises a comparator, and transmits the result of the decision which is obtained by comparing a predetermined voltage value with a value of the output voltage from the second step-down section to the processor.

9. The power supply circuit according to claim 2, wherein:
the power supply unit includes a step-down section which steps down a voltage of the input terminal and a logic circuit section which controls power supply from the input terminal to the step-down section,
the load is connected to an output terminal of a step-down section,
the capacitor includes a first capacitor which is connected to the switch and a second capacitor which is connected to the output terminal of the step-down section, and
the processor controls the logic circuit section depending on whether the switch operates to cause the short-circuit to occur or to open the connection.

10. The power supply circuit according to claim 9, wherein
the predetermined time is set to a longer time value as the voltage of the DC power supply becomes higher.

11. The power supply circuit according to claim 1, wherein the processor:
controls the switch to open the connection in a case in which an operation of the load is not confirmed after the switch operates to cause the short-circuit to occur,
controls the switch to cause the short-circuit to occur after the predetermined time elapses after controlling the switch to open the connection, and
controls the switch to maintain the short-circuit in a case in which the operation of the load is confirmed after the switch operates to cause the short-circuit to occur.

12. The power supply circuit according to claim 11, wherein the load outputs a predetermined signal at a time of the operation of the load, and the processor controls the switch to maintain the short-circuit in a case in which the predetermined signal is detected.

13. The power supply circuit according to claim 1, wherein
the load includes a CPU.

14. A power supply controlling method which is executed by a processor in a power supply circuit which includes a power supply unit which supplies DC power to a load, a switch which operates to cause a short-circuit to occur between a DC power supply and an input terminal of the power supply unit or to open a connection between the DC power supply and the input terminal of the power supply unit, and a sensor unit which measures a temperature, the processor controlling the switch, and the method comprising:
controlling the switch to cause the short-circuit to occur and thereafter deciding whether the DC power is supplied to the load;
controlling the switch to open the connection in a case in which it is decided that the DC power is not supplied to the load; and
setting a predetermined time which is to be taken until the switch is controlled to cause the short-circuit to occur in accordance with the temperature measured by the sensor unit, and controlling the switch to cause the short-circuit to occur after the predetermined time elapses after controlling the switch to open the connection.

15. A non-transitory computer-readable storage medium which stores a power supply control program which is used to make the processor execute the power supply controlling method according to claim 14.

* * * * *